United States Patent [19]
van der Lely

[11] Patent Number: 5,791,284
[45] Date of Patent: Aug. 11, 1998

[54] APPARATUS FOR DETERMINING POSITIONS OF TEATS IN A PROCESS OF AUTOMATICALLY MILKING ANIMALS

[75] Inventor: Alexander van der Lely, Baar, Switzerland

[73] Assignee: Maasland N.V. a Dutch Limited Liability Company, Maasland, Netherlands

[21] Appl. No.: 763,739

[22] Filed: Dec. 11, 1996

[30] Foreign Application Priority Data

Dec. 15, 1995 [NL] Netherlands .................... 1001912

[51] Int. Cl.⁶ .................................................. A01J 3/00
[52] U.S. Cl. ............................... 119/14.08; 119/14.02
[58] Field of Search ......................... 119/14.01, 14.02, 119/14.03, 14.08, 14.14

[56] References Cited

U.S. PATENT DOCUMENTS

| | | | |
|---|---|---|---|
| 3,577,104 | 5/1971 | Levy | 333/76 |
| 4,726,322 | 2/1988 | Torsius | 119/14.14 |
| 4,805,557 | 2/1989 | van der Lely et al. | 119/14.08 |
| 4,805,559 | 2/1989 | van der Lely et al. | 119/14.1 |
| 4,838,207 | 6/1989 | Bom et al. | 119/14.02 |
| 4,867,103 | 9/1989 | Montalescot et al. | 119/14.08 |
| 5,020,477 | 6/1991 | Dessing et al. | 119/14.08 |
| 5,042,428 | 8/1991 | van der Lely et al. | 119/14.08 |
| 5,056,466 | 10/1991 | Dessing et al. | 119/28 |
| 5,379,721 | 1/1995 | Dessing et al. | 119/14.08 |
| 5,524,572 | 6/1996 | Dessing et al. | 119/14.02 |
| 5,606,932 | 3/1997 | van der Lely | 119/14.14 |

FOREIGN PATENT DOCUMENTS

| | | |
|---|---|---|
| 0 619 941 A2 | 10/1994 | European Pat. Off. . |
| 0 639 327 A1 | 2/1995 | European Pat. Off. . |
| 93/02397 | 11/1993 | WIPO . |

OTHER PUBLICATIONS

International Search Report (PCT) for Netherlands Application No. 1001912, filed Dec. 15, 1995, which is in Dutch.

*Primary Examiner*—Ren Yan
*Assistant Examiner*—Dave A. Ghatt
*Attorney, Agent, or Firm*—Penrose Lucas Albright

[57] ABSTRACT

An apparatus for milking animals, such as cows, comprising at least one milking parlor including at least one milking robot for automatically connecting teat cups to the teats of an animal to be milked, automatically milking this animal, and automatically disconnecting the teat cups from the animal's teats. The apparatus is further provided with at least two detectors for determining the positions of the animal's teats, which detectors are fixedly mounted relative to the milking parlor so as to be movable in their own housings whereby they each scan a sector which includes the foremost teats of the animal. Each detector is protected by a dome-shaped filter which is transparent to signals received by the detectors for locating the animal's teats. A spray cleaning device mounted on a framework defining the milking parlor selectively sprays a fluid to clean each dome-shaped filter.

20 Claims, 2 Drawing Sheets

APPARATUS FOR DETERMINING POSITIONS OF TEATS IN A PROCESS OF AUTOMATICALLY MILKING ANIMALS

FIELD OF THE INVENTION

The present invention relates to an apparatus for milking animals, such as cows, comprising at least one milking parlor including at least one milking robot for automatically connecting teat cups to the teats of an animal to be milked, automatically milking the animal, and automatically disconnecting the teat cups from the teats. More particularly, the invention relates to such an apparatus that is provided with at least one detector for determining the position of the teats.

BACKGROUND OF THE INVENTION

Such an apparatus is known from, for example, PCT Patent Application No. PCT/GB93/02397, filed Nov. 22, 1993, International Publication No. WO 94/12020, dated Jun. 9, 1994. In the apparatus described in this International Patent Application, the detectors are constituted by elements for creating an image, in particular by video recording elements, which are arranged on both sides of the milking parlor. When arranging such detectors the problem may occur that, on the one hand, the detectors have to be disposed relatively close to the udder of the animals to be milked, while, on the other hand, the distance therefrom has to be sufficient so that the detectors are not damaged because, for example, of being kicked by the animal to be milked.

SUMMARY OF THE INVENTION

To obviate this drawback or at least limit it to a considerable extent, in accordance with the invention, the instant invention is characterized in that at least two detectors are mounted so as to be movable in their own housing, fixedly arranged relative to the milking parlor. By accommodating the detectors in such a housing, they are protected in particular against kicking by animals to be milked. Housings for the detectors are preferably installed on both sides of the milking parlor, either in the floor of the milking parlor, or on its floor, or near thereto.

The detectors in the housing can be passive, i.e., so that they do not transmit radiation and react on reflections therefrom, but rather that they react incident to radiation of a variety of frequencies; as such, they can be a device for creating an image and in particular by a video recording device or a video camera. On the other hand, the detectors can also be of the active type and be constituted by a transmitter-receiver, in particular by a laser transmitter and receiver element. Whatever type of detector is used, the detector is continuously movable so that the positions in three coordinates can be determined of at least the teats which, seen from several views from the detectors, are the more important ones; the detector can in particular be mounted movably in its housing in such a manner that by means of said detector a space sector can be scanned. Therefore the invention also relates to an apparatus for milking animals, such as cows, comprising at least one milking parlor including at least one milking robot for automatically connecting teat cups to the teats of an animal to be milked, automatically milking this animal, and automatically disconnecting the teat cups from the teats, which apparatus is provided with at least one detector for determining the position of the teats. This apparatus is characterized in that at least two of these detectors comprise a transmitter-receiver, in particular a laser transmitter and receiver element, whereby by means of each of these detectors a space sector can be scanned. In particular the detectors can be disposed in the housing so as to be motor drivable about two axes, whereby in a concrete embodiment a detector is movable about a substantially horizontal axis as well as about its own longitudinal axis.

According to another aspect of the invention, when a laser transmitter and receiver device is used, a housing can be provided with a filter which permits transmission of at least those frequencies within the frequency band to which the detector is sensitive. This filter can comprise the upper side of the housing. An advantageous solution is obtained when the housing is fitted in the floor of the milking parlor and the upper side of the housing comprises a dome-shaped element. To enable the detector disposed in the housing to function optimally, at least the upper side of the housing should be cleaned. For that purpose, in accordance with the invention, the apparatus is provided with a cleaning device for this housing, in particular a spraying device for the upper side of the housing.

BRIEF DESCRIPTION OF THE DRAWINGS

For a better understanding of the invention and to show how the same may be carried into effect, reference will now be made, by way of example, to the embodiment shown in the accompanying drawings, in which.

DESCRIPTION OF THE PREFERRED EMBODIMENT

Figure 1:
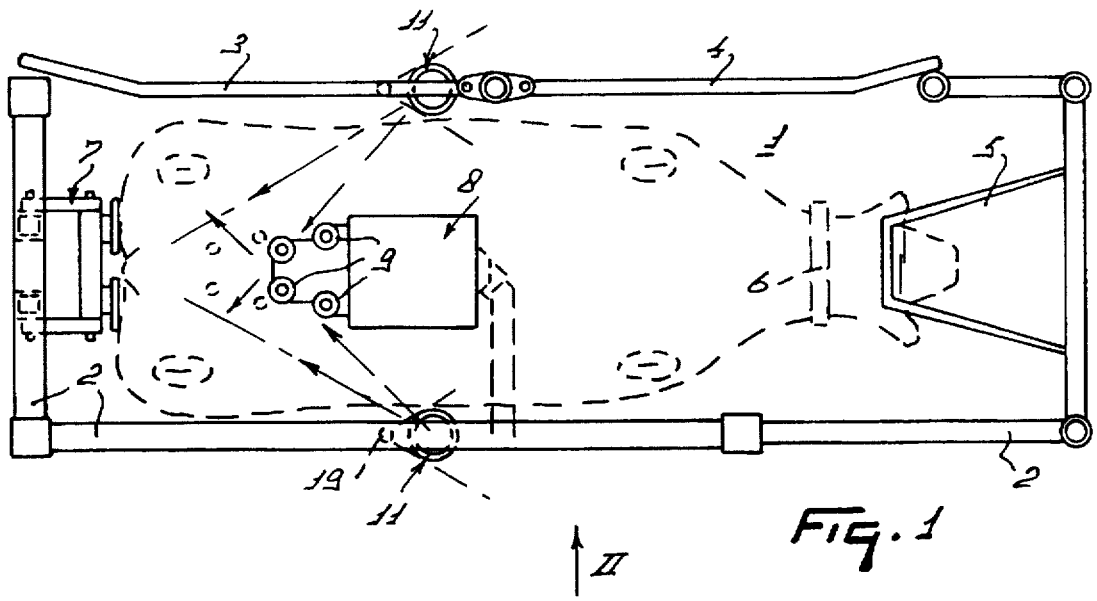
FIG. 1 shows schematically, in plan view, the apparatus according to the invention.
Figure 2:
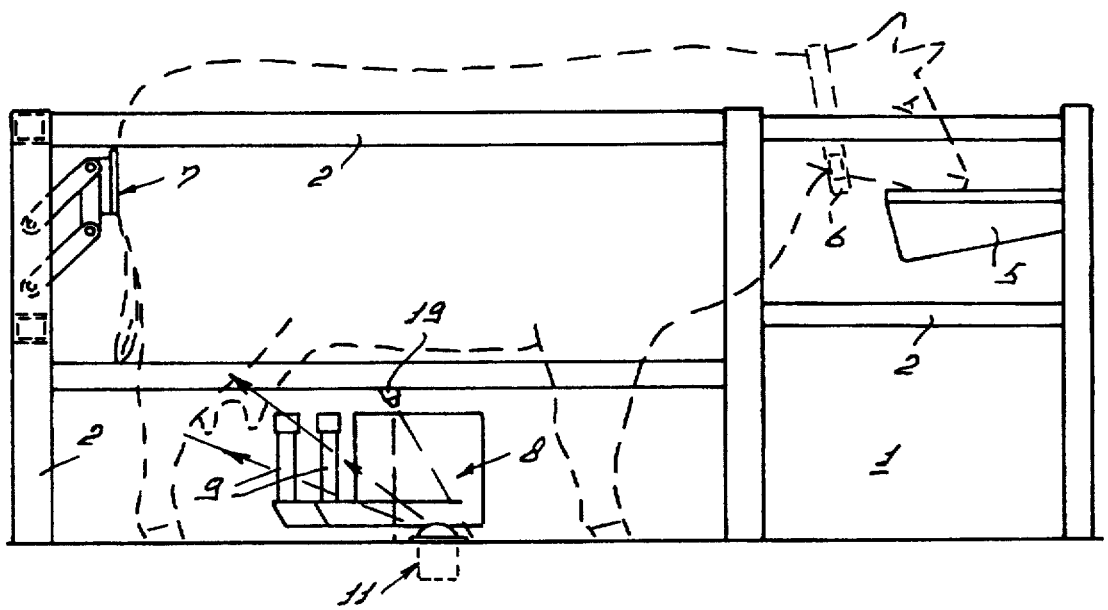
FIG. 2 shows schematically a side view of said apparatus.
Figure 3:
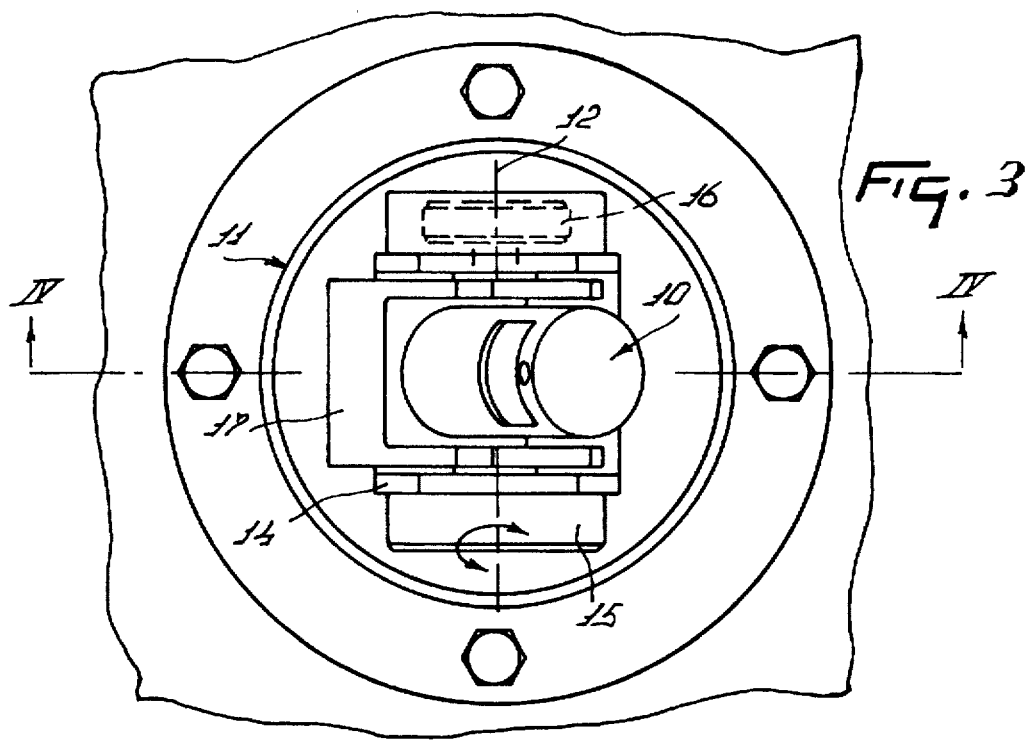
FIGS. 3 and 4 show a plan view and a longitudinal cross-sectional view of a detector respectively in accordance with the invention which is disposed in a housing.
Figure 4:
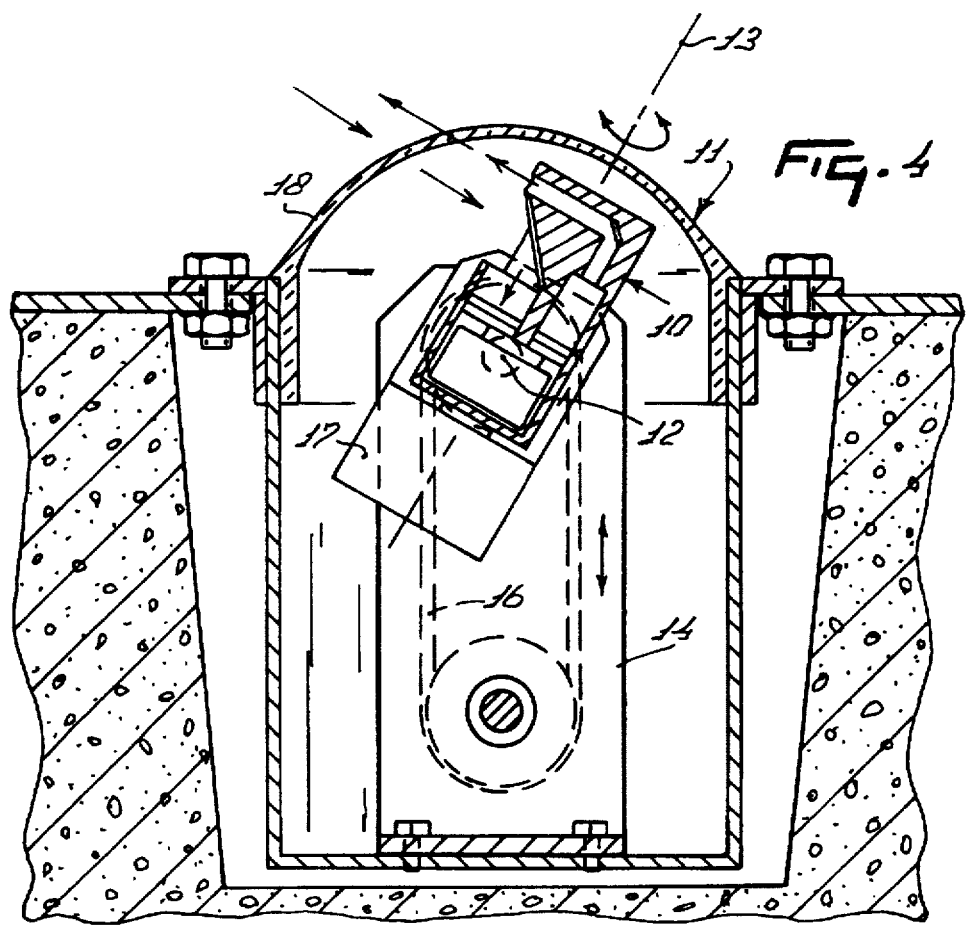

The figures show a milking compartment or parlor 1 in which an animal to be milked is shown in dashed lines. Milking parlor 1 is defined by a framework 2 in which, at one of the longitudinal sides, an entrance door 3 and an exit door 4 are provided. At the front side of the milking parlor, a feeding trough 5, constituting part of a automatic feeding system, is connected to framework 2. An animal entering milking parlor 1 is identified by an animal identification system of a type which is well known per se, constituted by a collar 6, worn by the animal, which collar is provided with a transponder that cooperates with a sensor disposed near the feeding trough, which sensor is in connection with the computer system of the apparatus. Inasmuch as an animal identification system is not part of the invention, it will not be described in detail. In order to position the animal in the longitudinal direction, a buffer element 7 is mounted at the rear side of the milking parlor, as shown in FIGS. 1 and 2, to be pressed against the rear side of the animal. The apparatus further comprises a milking robot 8 for automatically connecting teat cups 9 to the teats of an animal to be milked, automatically milking the animal and automatically disconnecting teat cups 9 from the teats. Such milking robots have been known for some time and will not be described in more detail herein. For automatically connecting the teat cups to the teats of an animal to be milked it is necessary to know the position of the animal's teats. Although for this purpose historic data of the teats' position may be used, in particular when the animal is accurately positioned in the milking parlor or when the position of the animal in the milking parlor is known, in addition or in lieu thereof, one or more detectors which are specially provided therefor can be used. In the present embodiment, two detectors are provided for determining the position of the teats in three coordinates; these detectors are indicated generally by the reference numeral 10 (see FIGS. 3 and 4). These detectors are disposed in their own housings 11, arranged in fixed positions relative to the milking parlor; two housings preferably being positioned, as indicated in FIG. 1, on each side of milking parlor 1, either in a cavity in the floor of said milking parlor as shown, or on the floor or near thereto. As indicated in FIGS. 2 and 4, housing 11 is preferably incorporated to a considerable extent in a cavity in the floor of the milking parlor. Although, in this embodiment passive detectors may be used, in particular elements for creating an image, or more specifically, a video recording element or a video camera, each of these detectors, one of which is shown in FIGS. 3 and 4, is constituted by a transmitter-receiver and specifically by a laser transmitter and receiver element. The detector shown in FIGS. 3 and 4 comprise the type described in European Patent Application 0455305. The description of the detector included therein is therefore incorporated by reference herein. For the purpose of adapting this detector to the function of determining the position of the teats in three coordinates, the detector is mounted in the housing 11 so as to be movable about a substantially horizontal axis 12, as well as about its own longitudinal axis 13. Detector 10 is movably mounted on a mounting element 14 screwed on the bottom of its housing 11. A motor 15 is fastened to said mounting element 14 which, by means of a belt transmission 16, is capable of turning detector 10 and causing it to reciprocate in an arc about axis 12. Detector 10, which is movable about the axis 12, is provided at its lower side with a motor 17 enabling detector 10 to rotate and to reciprocate in an arc about its own longitudinal axis 13. Motors 15 and 17 are controlled by the computer system of the apparatus. This computer system also constitutes part of milking robot 8. Under the control of such computer system, a space sector can be scanned by detector 10. In order to be able to determine the position in three coordinates of at least the animal's teats which, seen in the range of view of the detector, are the foremost ones, detectors 10 are arranged in their housings so that those teats are located within the space sector which is scanned by means of detectors 10. Although it is preferable to dispose each movably mounted detector 10 in its housing 11, it is also possible to dispose it outside of its housing. But, similarly in that case, of course, it is possible to scan a space sector where the teats should be located by means of the detectors, and thus to determine the three position coordinates of the teats.

For the purpose of increasing the reliability of the detector, housing 11 can be provided with a filter which at least transmits frequencies within the frequency band to which the detector is sensitive. When the detectors are arranged in the floor of the milking parlor or near thereto, this filter can also constitute in a favorable manner the upper side of the housing. To optimize the protection of the detectors, the housing, as indicated in FIG. 4, comprises a dome-shaped element 18 serving as a cover of housing 11; said dome-shaped element 18 can also function as a filter for light incident on the detector. Furthermore, to avoid defective functioning of the detectors, the dome-shaped element 18 should be cleaned regularly. For that purpose the apparatus is provided with a cleaning device 19 for housing 11. In the present embodiment, on both sides of the milking parlor, there is fastened to framework 2 a cleaning device 19 constituted by a spraying device, by means of which a cleaning fluid is sprayed over the upper side of housing 11 and, in particular, over its dome-shaped element 18.

The invention is not restricted to the embodiment described and shown in the figures, but also relates to all modifications thereof which fall within the scope of the following claims.

Having disclosed my invention, what I claim as new and to be secured by Letters Patent of the United States is:

1. An apparatus for milking animals, such as cows, comprising at least one milking parlor including at least one milking robot for automatically connecting teat cups to the teats of an animal to be milked, automatically milking this animal, and automatically disconnecting the teat cups from the animal's teats, at least two detectors determining the positions of the teats, and housings for said detectors fixedly arranged relative to the milking parlor, said detectors mounted in their respective said housings so as to be movable therein.

2. An implement as claimed in accordance with claim 1 wherein said housings for said detectors are arranged on both sides of the milking parlor in cavities provided in the floor of said milking parlor.

3. An apparatus in accordance with claim 1 wherein said detectors comprise video means for receiving and transmitting an image.

4. An apparatus as claimed in claim 1 wherein said detectors comprise transmitting and receiving means.

5. An apparatus in accordance with claim 4 wherein said detectors each comprise a laser transmitter and receiver element.

6. An apparatus in accordance with claim 1 wherein said detectors each comprises two motors for rotating the respective said detector about a horizontal axis and about an axis extending longitudinally through the respective said detector, said motors causing the respective said detector to reciprocate in arcs so that a space sector containing at least one of the animal's teats is scanned by said detector.

7. An apparatus in accordance with claim 6 wherein said detectors together scan at least the animal's foremost teats.

8. An apparatus for milking animals, such as cows, comprising at least one milking parlor including at least one milking robot for automatically connecting teat cups to the teats of an animal to be milked, automatically milking this animal, and automatically disconnecting teat cups from the animal's teats, at least two detectors arranged and constructed so that direct physical contact thereof by said animal is avoided, each of said detectors comprising a housing which is disposed in a fixed position relative to said milking parlor and a transmitter-receiver and scanning means that scans a space sector.

9. An apparatus in accordance with claim 8 wherein said transmitters-receiver comprises a laser transmitter and receiver element in each of said detectors.

10. An apparatus in accordance with claim 8 wherein each said detector comprises at least one motor and is motor drivable about two axes.

11. An apparatus in accordance with claim 10 wherein one of said axes is horizontal and the other of said axes comprises a longitudinal axis of said detector.

12. An apparatus in accordance with claim 8 wherein said transmitter receiver element transmits and is sensitive to an electromagnetic frequency, the apparatus comprising a filter which permits the transmission and reception of selected electromagnetic frequencies including said frequency to which said transmitter-receiver is sensitive.

13. An apparatus for milking animals, such as cows, comprising:

at least one milking parlor including at least one milking robot for automatically connecting teat cups to the teats of an animal to be milked, automatically milking this animal, and automatically disconnecting the teat cups from the animal's teats, at least two detectors, each of said detectors comprising a transmitter-receiver and scanning means that scans a space sector wherein said transmitter receiver element transmits and is sensitive to an electromagnetic frequency, a filter which permits the transmission and reception of selected electromagnetic frequencies including said frequency to which said transmitter-receiver is sensitive, and two housings, one for each of said detectors, each said housing supporting a said filter.

14. An apparatus in accordance with claim 13 wherein a said filter comprises the upper side of its respective said housing.

15. An apparatus in accordance with claim 14 wherein said filter has a dome-shaped configuration.

16. An apparatus in accordance with claim 13 comprising a cleaning device for cleaning said filter.

17. An apparatus in accordance with claim 16 wherein said cleaning device comprises a spraying device for spraying said filter with a fluid to clean same.

18. An apparatus for automatically milking animals comprising a milking compartment, a milking robot associated with said milking compartment for automatically connecting teat cups to the teats of an animal to be milked, automatically milking said animal and automatically disconnecting said teat cups from said animal's teats, a pair of detectors mounted adjacent opposite sides of said milking compartment, each said detector comprising a laser transmitter and receiver element, a housing in which each said element is mounted, two motors for driving each said element disposed in said housing and connected to each said element so that each said element is drivable to move in arcs about two axes, one of said axes being a substantially horizontal axis and the other of said axes being said detector's longitudinal axis, each said housing being provided with a filter which permits the transmission therethrough of electromagnetic frequencies to which said detector on said housing is sensitive, said filter being configured in a dome-shape.

19. An apparatus in accordance with claim 18 wherein said milking compartment comprises a floor having a pair of cavities, said cavities being respectively adjacent its longer sides, each said housing being firmly secured in a respective said cavity.

20. An apparatus in accordance with claim 19 wherein said milking compartment is defined by a framework, a pair of cleaning devices mounted on said framework, each said cleaning device comprising a fluid spraying device for selectively spraying a cleaning fluid on each of said dome-shaped filters for cleaning same.

* * * * *